United States Patent
Kuo et al.

(10) Patent No.: US 7,057,380 B2
(45) Date of Patent: Jun. 6, 2006

(54) ADAPTIVE DEAD-TIME CONTROLLER

(75) Inventors: Ming-Ying Kuo, Hsinchu (TW); Hung-Ta Lee, Hsinchu (TW)

(73) Assignee: Leadtrend Technology Corporation, Hsinchu (TW)

( * ) Notice: Subject to any disclaimer, the term of this patent is extended or adjusted under 35 U.S.C. 154(b) by 51 days.

(21) Appl. No.: 10/950,552

(22) Filed: Sep. 28, 2004

(65) Prior Publication Data
US 2005/0146311 A1    Jul. 7, 2005

(30) Foreign Application Priority Data
Jan. 7, 2004    (TW) .............................. 93100378 A

(51) Int. Cl.
  G05F 1/44    (2006.01)
  G05F 1/56    (2006.01)
(52) U.S. Cl. ....................................... 323/284; 323/282
(58) Field of Classification Search ................. 323/282, 323/284, 286, 285
See application file for complete search history.

(56) References Cited

U.S. PATENT DOCUMENTS

| | | | |
|---|---|---|---|
| 4,686,428 A * | 8/1987 | Kuhnel et al. | 315/307 |
| 6,744,649 B1 * | 6/2004 | Yang et al. | 363/98 |
| 6,954,056 B1 * | 10/2005 | Hoshino et al. | 323/285 |

* cited by examiner

*Primary Examiner*—Bao Q. Vu
(74) *Attorney, Agent, or Firm*—Bacon & Thomas, PLLC

(57) ABSTRACT

An adaptive dead-time controller is provided to improve a conversion efficiency of a power converter at a low/no load condition. The adaptive dead-time controller has a reference voltage generator, an error amplifier, a comparator, an oscillator, an adaptive dead-time generator and a flip-flop. The adaptive dead-time controller outputs a gate pulse according to an output voltage and an oscillation. When power converter is at a low/no load condition, the adaptive dead-time generator delays a rising edge of an oscillation signal by a dead-time from a rising edge of a clock signal, so the frequency of the gate pulse and the power consumption of the power converter are reduced.

17 Claims, 9 Drawing Sheets

ADAPTIVE DEAD-TIME CONTROLLER

BACKGROUND OF THE INVENTION

1. Field of the Invention

The present invention relates to an adaptive dead-time controller and, more particularly, to an adaptive dead-time controller for improving the conversion efficiency of a power converter in light load or no load conditions.

2. Description of the Related Art

As shown in FIG. 1, in a power supply circuit 2, a power converter 8 is used for receiving an external input voltage Vin and providing an output voltage Vo to a load device 6. A feedback control circuit 10 outputs a proper gate pulse to the power converter 8 according to the output voltage Vo and a current sense (CS) level for providing more or less power to a load device 6. For example, when a load device 6 presents a heavy load, the feedback control circuit 10 requires the power converter 8 to provide a higher output power to satisfy the power consumption of a load device 6; when a load device 6 presents a light load, the feedback control circuit 10 requires the power converter 8 to provide lower output power to conserve power. The power converter 8 can be a buck converter, a boost converter, a flyback converter or a forward converter for different circuits, and the feedback control circuit 10 generally utilizes a pulse width modulation (PWM) method to generate the gate pulse. The feedback control circuit 10 in FIG. 1 is a current mode control unit, which outputs the gate pulse according to the output voltage Vo and a switch current CS of a switch unit (not shown). Alternatively, the feedback control circuit 10 also can be a voltage mode control unit which only detects the output voltage Vo. A user can decide which kind of unit is most appropriate. Accordingly, how the feedback control circuit 10 dynamically adjusts the operation mode of the power converter 8 according to the loading conditions presented by a load device 6 is a very important factor for the output efficiency of the power supply 2.

Please refer to FIG. 2 and FIG. 3. FIG. 2 is a functional block drawing of the prior art feedback control circuit 10 and FIG. 3 is an operation timing of the circuit 10. The prior art feedback control circuit 10 comprises a control circuit, a feedback compensation circuit 17 and an input compensation circuit 18. The control circuit further comprises an error amplifier 11, a reference voltage generator 12, a comparator 13, an oscillator 14, an SR type flip-flop 15, and a gate driver 16.

The basic operation of the prior art feedback control circuit 10 is described as follows. The output voltage Vo is input into a negative end of the error amplifier 11 via the input compensation circuit 18. The error amplifier 11 compares the compensated output voltage with a reference voltage Vref generated by the reference voltage generator 12 and generates an error voltage Ve to the feedback compensation circuit 17 and a negative end of the comparator 13. The feedback compensation circuits 17 and the input compensation circuit 18 consist of resistors and capacitors, which are used for stabilizing the operations of the prior art feedback control circuit 10.

The comparator 13 compares the error voltage Ve with a voltage of a switch current CS output by a switch unit (not shown, but mounted in the power converter 8) to generate a reset signal Reset to the SR type flip-flop 15. An oscillation signal CLKOUT generated by the oscillator 14 regularly causes the gate pulse to return to a high voltage level.

When the voltage of the switch current CS output by the switch unit is smaller than the error voltage Ve, the reset signal Reset is kept at a low voltage level. The oscillation signal CLKOUT sets the gate pulse at high voltage level by setting the output of the SR type flip-flop 15 at a high voltage level. The voltage level of the gate pulse is not kept at a high level until the voltage of the switch current CS is larger than the error voltage Ve, and then the gate pulse is reset to a low voltage level. A pulse width of the gate pulse generated by a setting-resetting cycle determines the output power of the power converter 8.

Please refer to FIG. 4 and FIG. 5. FIG. 4 is a functional block drawing of the oscillator 14 and FIG. 5 is an operation timing of the oscillator 14. The oscillator 14 comprises a charging current source 140, a discharging current source 141, a switch capacitor 142, comparators 143 and 144, an SR type flip-flop 145, an inverter 146, and switch transistors 147 and 148. The comparator 143 and the comparator 144 compare the oscillation signal OSC with a high reference voltage VH and a low reference voltage VL respectively. If the oscillation signal OSC is higher than the high reference voltage VH, an output clock signal CLK2 of the comparator 143 switches to the high voltage level, and then an output clock signal CLK3 of the SR type flip-flop 145 is switched to the low voltage level, so the switch transistor 148 is active to reduce the voltage level of the oscillation signal OSC (discharged by the discharging current source 141). If the oscillation signal OSC is lower than the low reference voltage VL, the oscillation signal CLKOUT of the comparator 144 is at the high voltage level, and the output clock signal CLK3 is switched to a high voltage level, so that the switch transistor 147 is enabled to raise the voltage level of the oscillation signal OSC (charged by the charging current source 140). Accordingly, the oscillator 14 outputs the oscillation signal CLKOUT with a regular cycle.

However, the frequency of the oscillation signal CLKOUT is fixed, and the frequency of the gate pulse of the power converter 8 is also fixed. Gate pulses with a fixed frequency cause the power converter 8 to have high switching losses during light load or no load conditions.

Therefore, it is desirable to provide an adaptive dead-time controller to mitigate and/or obviate the aforementioned problems.

SUMMARY OF THE INVENTION

To avoid the above-mentioned defects, the present invention provides an adaptive dead-time generator for adjusting an oscillation signal corresponding to a clock signal according to an output voltage, comprising: a converting circuit for outputting a converted signal corresponding to the output voltage; a controlled power source for providing an output energy according to the converted signal; a independent power source for providing a default energy; an inverter for inputting the clock signal to output an inverted clock signal; an energy storage unit for storing the output energy and the default energy and providing a charge voltage; a switch for providing a path for the energy storage unit to discharge the output energy and the default energy according to the inverted clock signal; and a comparator for comparing the charge voltage with a threshold voltage and outputting the oscillation signal; wherein when the output voltage drops, a rising edge of the oscillation signal is delayed by a dead-time from a rising edge of the clock signal.

The present invention provides an adaptive dead-time controller for adjusting an operating frequency of a power converter according to a load condition, comprising: a reference voltage generator for providing a reference voltage; an error amplifier for comparing an output voltage with the reference voltage, then outputting an error voltage, the output voltage being proportional to the load condition; a comparator for comparing the error voltage with a switch voltage then outputting a reset signal; an oscillator for providing a clock signal; an adaptive dead-time generator for adjusting an oscillation signal corresponding to the clock signal according to the load condition, then outputting the adjusted oscillation signal; and a flip-flop for outputting a gate pulse according to the reset signal and the oscillation signal, wherein the gate pulse is adapted to adjust the function of the power converter, when the load condition is light, a rising edge of the oscillation signal is delayed by a dead-time from a rising edge of the clock signal. Because the cycle time of the oscillation signal is adjusted based on the output voltage corresponding to a load condition, if the load condition presents a low load or no load condition, the dead-time will add to the oscillation signal and the power consumption of the power converter will be reduced.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
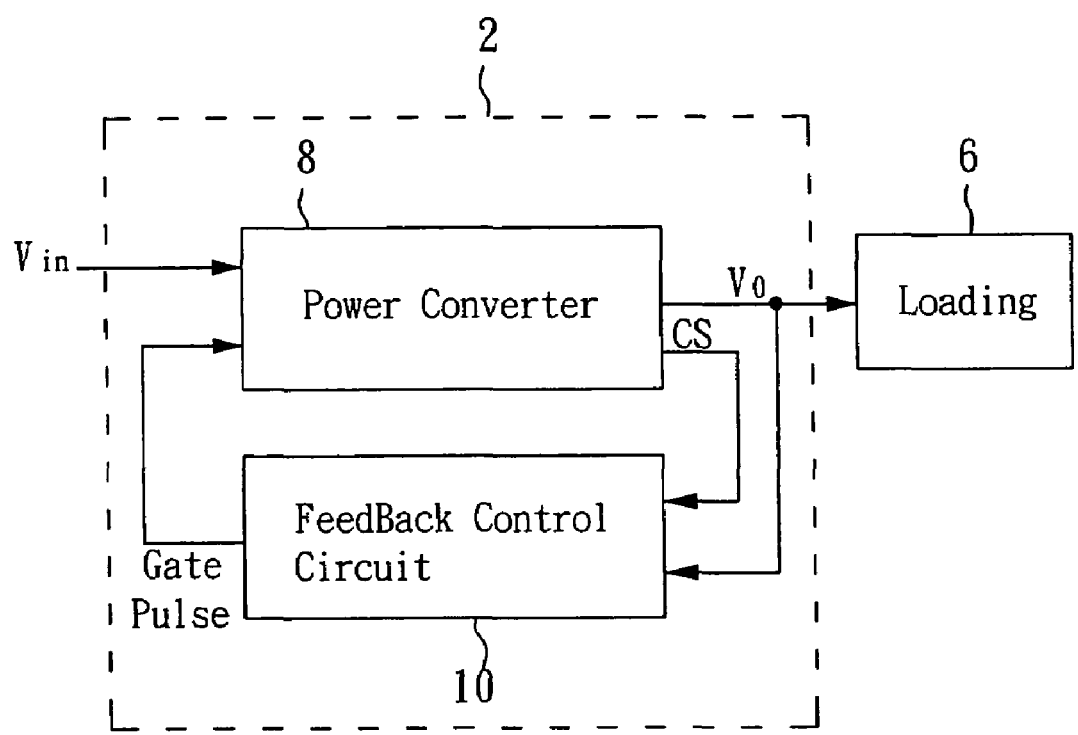
FIG. 1 is a schematic drawing of a power supply circuit.
Figure 2:
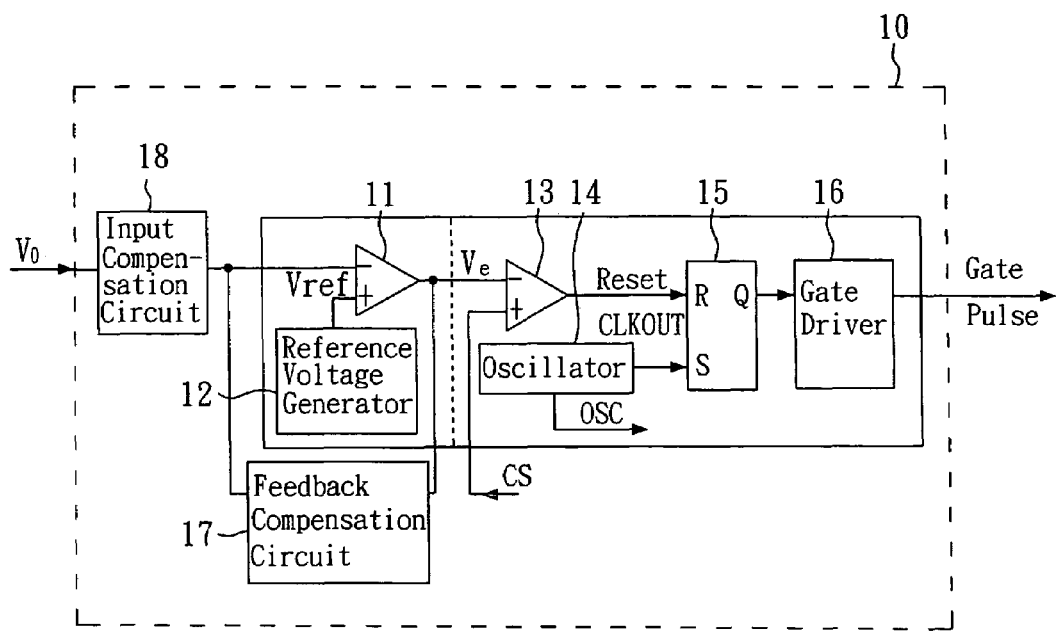
FIG. 2 is a functional block drawing of a prior art feedback control circuit.
Figure 3:
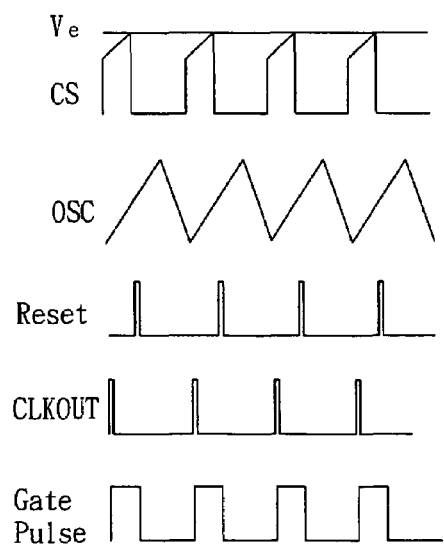
FIG. 3 is an operation timing of the prior art feedback control circuit 10.
Figure 4:
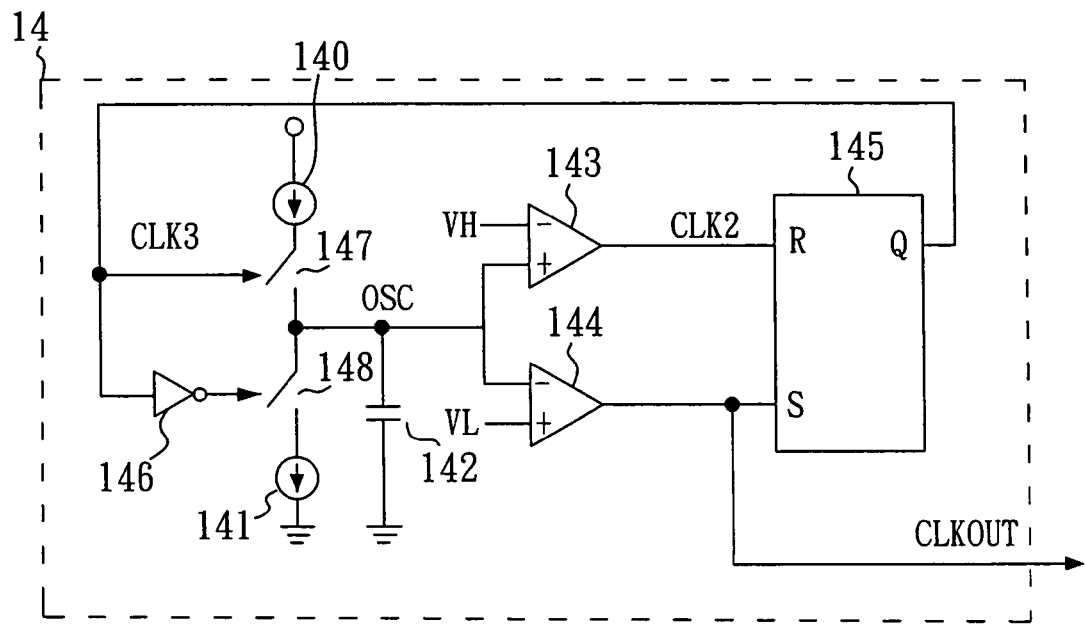
FIG. 4 is a functional block drawing of an oscillator.
Figure 5:
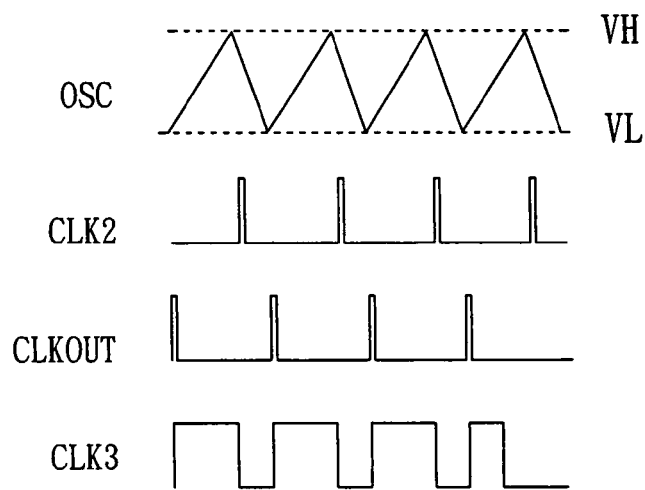
FIG. 5 is an operation timing of the oscillator.
Figure 6:
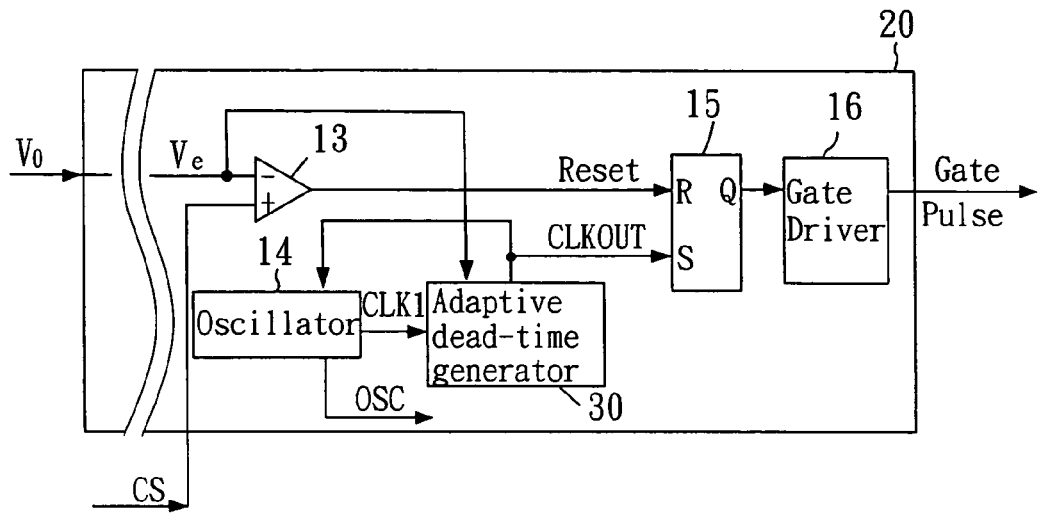
FIG. 6 is a functional block drawing of a feedback control circuit of the present invention.
Figure 7:
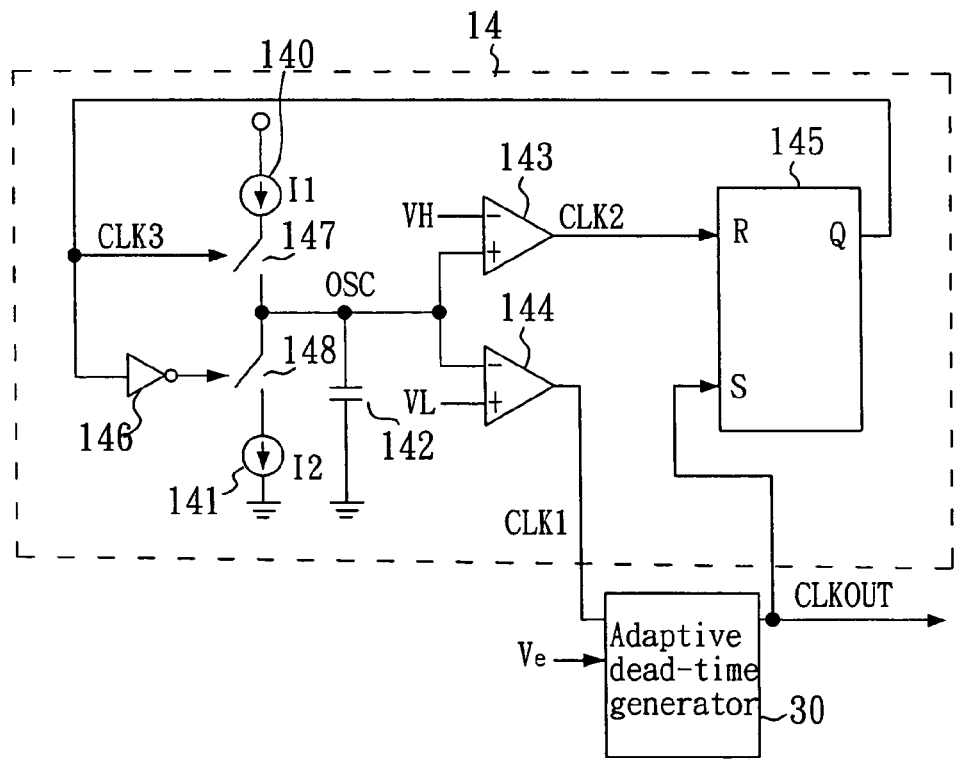
FIG. 7 is another functional block drawing of the feedback control circuit 20 of the present invention.

As shown in FIG. 6, the present invention provides an adaptive dead-time generator 30 which can be added onto the prior art feedback control circuit 10 to form an adaptive dead-time controller 20 without changing any other units, and the adaptive dead-time generator 30 is mounted between the oscillator 14 and the SR type flip-flop 15. As shown in FIG. 7, the oscillator 14 and the adaptive dead-time generator 30 are electrically connected together. Therefore, when the power converter 8 is under light load or no load conditions, the error voltage Ve will be dropped and the adaptive dead-time controller 30 extends the cycle time of the oscillation signal OSC (the extension and the load condition are inversely proportional), so that the cycle time of the oscillation signal CLKOUT is also extended, which is equivalent to extending a pulse period of the gate pulse to reduce the switch consumption of the power converter 8.

Figure 8:
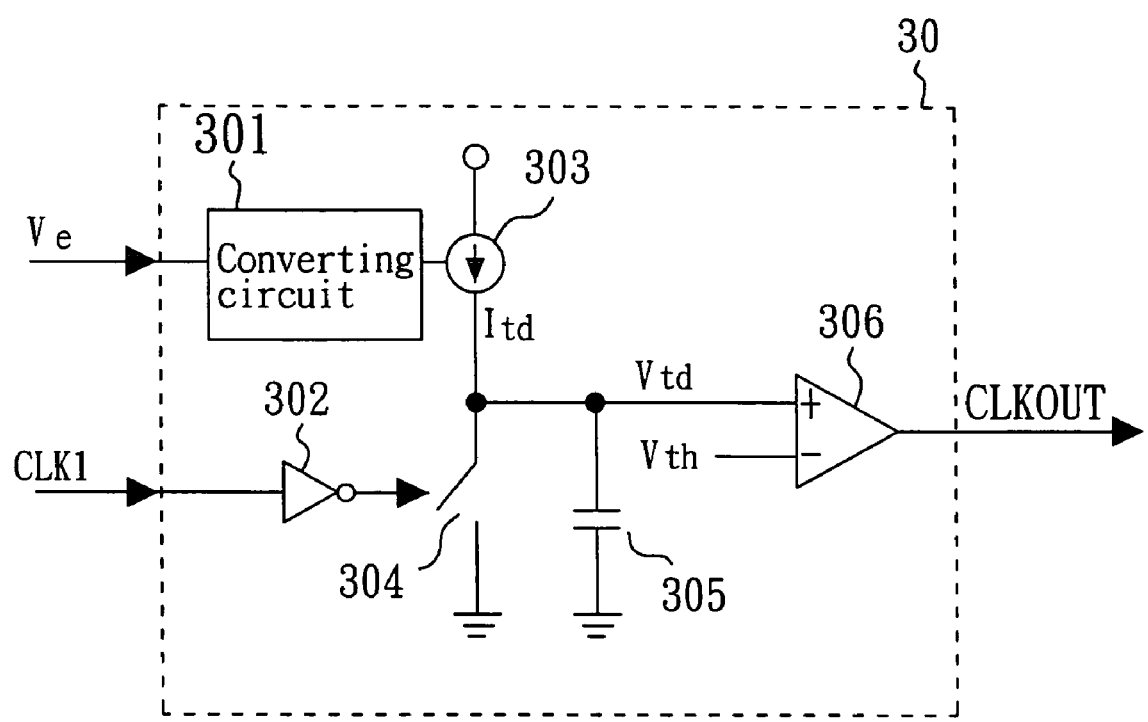
FIG. 8 is a functional block drawing of an adaptive dead-time controller 30 of the present invention.
Figure 9:
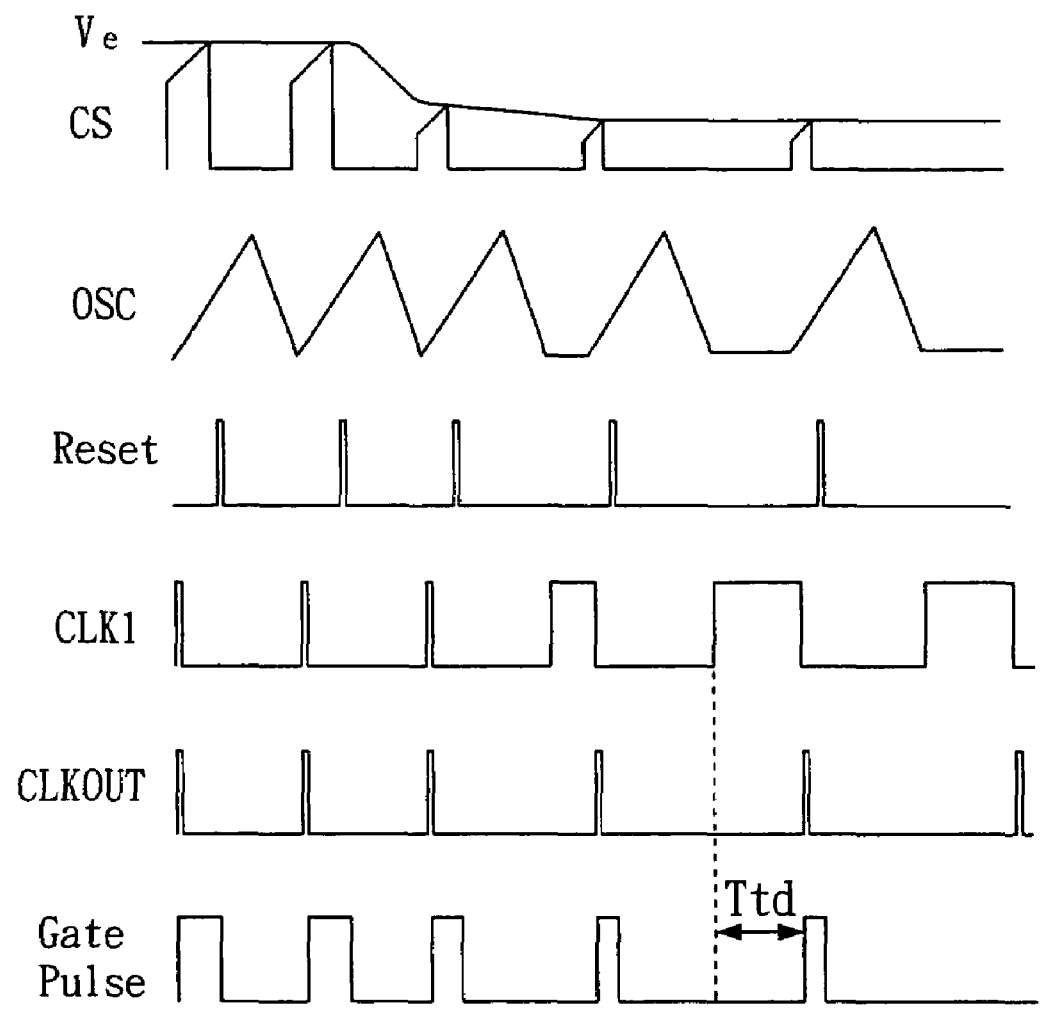
FIG. 9 is an operation timing of the adaptive dead-time controller of the present invention.

Please refer to FIG. 8 and FIG. 9. FIG. 8 is a functional block drawing of the adaptive dead-time generator 30 of the present invention and FIG. 9 is an operation timing of the adaptive dead-time controller 20 and the adaptive dead-time generator 30 according to the present invention. The adaptive dead-time generator 30 of the present invention comprises a converting circuit 301, an inverter 302, a controlled current source 303, a switch transistor 304, a capacitor 305, and a comparator 306. The converting circuit 301 outputs a converted signal to the controlled current source 303 according to the error voltage Ve to adjust the charging current $I_{td}$ (for charging the capacitor 305) provided by the controlled current source 303. Alternatively, the controlled current source 303 can also be replaced by a controlled voltage source, and the converting circuit 301 can also output the converted signal to the controlled voltage source according to the error voltage Ve. Therefore, the charging current $I_{td}$ and the error voltage Ve have a functional relationship; the function relationship can be a first order function, a second order function or an exponential function, though the first order functional relationship is preferable.

The adaptive dead-time generator 30 is an analog circuit. However, the controlled current source 303 and the converting circuit 301 can be replaced by a voltage controlled oscillator (VCO); the transistor 304, the capacitor 305, and the comparator 306 are then replaced by a counter, and the output of the inverter 302 is sent to the counter, to form a digital circuit.

When the output voltage drops, the rising edge of the oscillation signal CLKOUT is delayed by a dead-time from the rising edge of output clock signal CLK1.

When the error voltage Ve is kept at a high voltage level for heavy load, the charging current $I_{td}$ corresponding to the error voltage Ve is larger so that it can quickly charge the capacitor 305 and the charging voltage Vtd rapidly exceeds a threshold voltage Vth and then outputs high level oscillation signal CLKOUT. Assuming that the charging time is so short that it can be ignored, the clock signal CLK1 output by the comparator 144 is identical with the oscillation signal CLKOUT output by the comparator 306. Therefore, under high loads, the adaptive dead-time controller 20 of the present invention operates identically with the prior art feedback control circuit 10.

Figure 10:
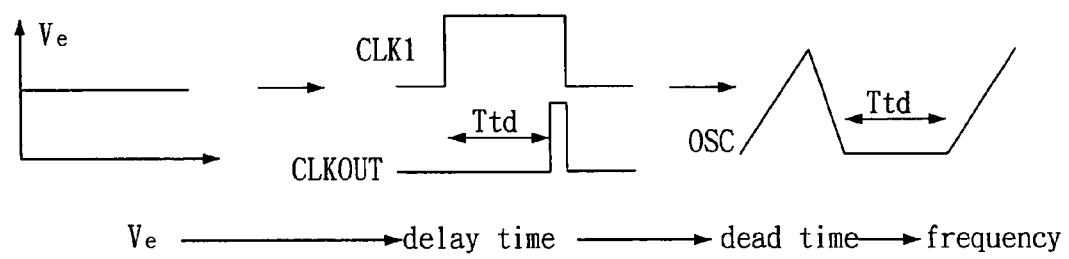
FIG. 10 is a relationship schematic drawing of an error voltage, an oscillation output signal, and an oscillation signal.

When the error voltage Ve drops for lower load, the charging current $I_{td}$ is therefore limited, thus a longer time is required to charge the capacitor 305 for exceeding the threshold voltage Vth, and this extended time td is called the dead-time. When the charging voltage Vtd of the capacitor 305 is equal to or larger than the threshold voltage Vth, the comparator 306 outputs a high level oscillation signal CLKOUT. As shown in FIG. 10, a rising edge of the oscillation signal CLKOUT is delayed by an extended time Ttd from the rising edge of the clock signal CLK1, and falling edges of the clock signal CLK1 and the oscillation signal CLKOUT are synchronized. Therefore, the oscillation signal CLKOUT is delayed by the extended time Ttd, but its waveform is otherwise no different. In the extended time Ttd, an oscillation signal OSC is delayed by the extended time Ttd and the cycle of the gate pulse corresponding to the oscillation signal OSC is also delayed by the extended time Ttd. Therefore, the gate pulse has a lower frequency under a lower load. As shown in FIG. 10, the adaptive dead-time generator 30 can adjust the extended time Ttd according to the change of the error voltage Ve to adjust the frequency of the oscillation signal OSC.

The operation of the digital circuit is similar to that of the analog circuit. When the clock signal CLK1 is at a high level, the inverter 302 enables the counter, and the voltage controlled oscillator outputs clock signals with different cycles according to the different error voltages Ve (for example, the higher the error voltage Ve, the shorter the clock pulse output signal cycle). The counter counts the clock signal CLK1, and when the count exceeds a threshold number, the oscillation signal CLKOUT is output. Thus, the function is similar to the adaptive dead-time generator 30.

First Embodiment

Figure 11:
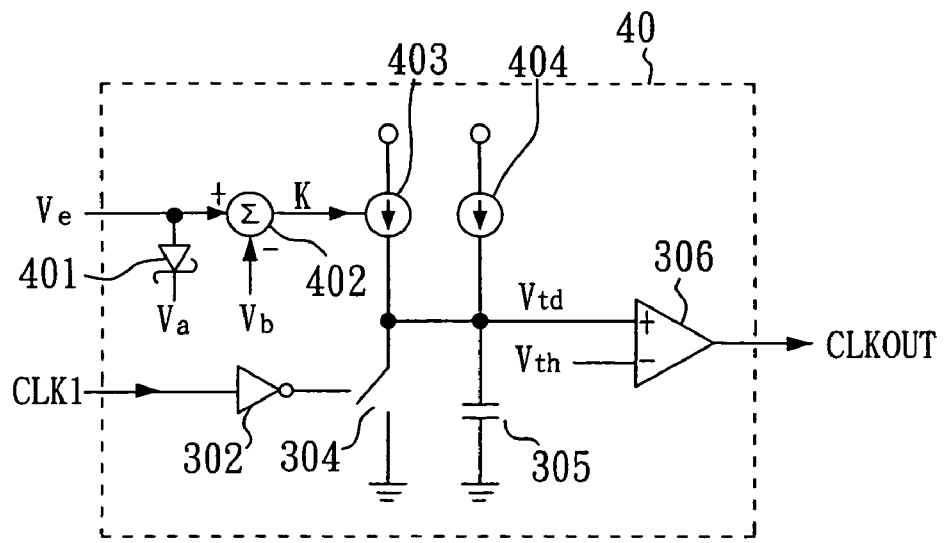
FIG. 11 is a functional block drawing of a first embodiment of the adaptive dead-time controller according to the present invention.

As shown in FIG. 11, a first embodiment of an adaptive dead-time generator 40 comprises a schottky diode 401, an adder 402, a voltage controlled current source 403, a standard current source 404, an inverter 302, a switch transistor 304, a capacitor 305, and a comparator 306. As shown, the converting circuit 301 and the current source 303 are replaced by the schottky diode 401, the adder 402, the voltage controlled current source 403 and the standard current source 404. If a minor voltage drop of the schottky diode 401 is ignored, the schottky diode 401 keeps the error voltage Ve at the highest voltage Va; the adder 402 adds a negative default voltage Vb and the error voltage Ve, and then controls a supply current of the voltage controlled current source 403 according to the result. For example, the supply current of the current source 403 may be K times the result of the adder 402, wherein $$K = \frac{I2 - I1}{Va - Vb}.$$

Figure 12:
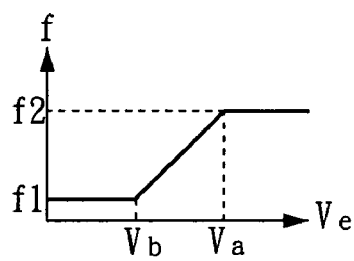
FIG. 12 is an operation timing of the first embodiment of the adaptive dead-time controller according to the present invention.
Figure 12:
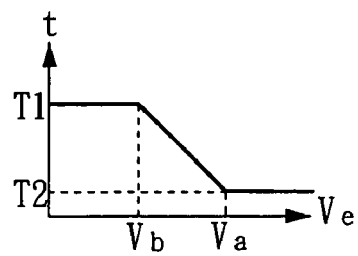
Figure 12:
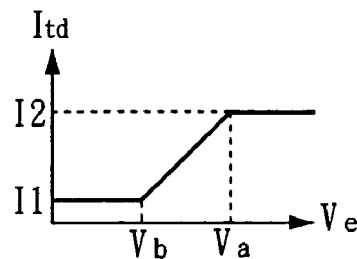

Please refer to FIG. 12. Under heavy load conditions, the voltage controlled current source 403 and the standard current source 404 provide a maximum current I2 to charge the capacitor 305, and the oscillation signal CLKOUT corresponds to a maximum frequency f2; when the load is at a minimum, only the standard current source 404 provides a minimum current I1 to charge the capacitor 305, and the oscillation signal CLKOUT is at a minimum frequency f1.

Second Embodiment

Figure 13:
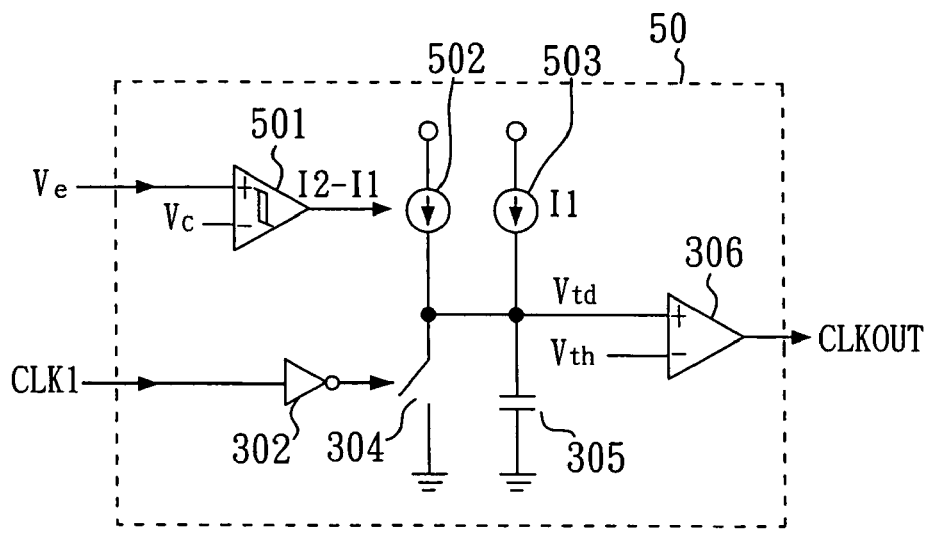
FIG. 13 is a functional block drawing of a second embodiment of an adaptive dead-time controller according to the present invention.
Figure 14:
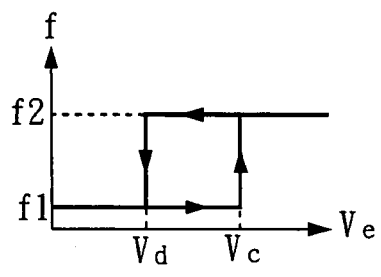
FIG. 14 is an operation timing of the second embodiment of the adaptive dead-time controller according to the present invention.
Figure 14:
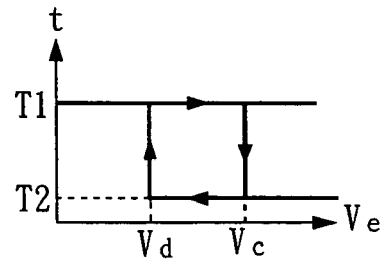
Figure 14:
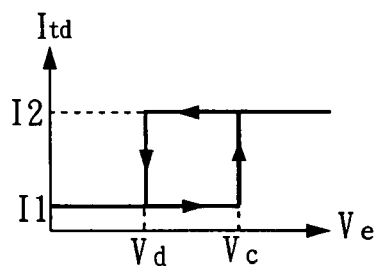

As shown in FIG. 13, a second embodiment of the adaptive dead-time controller 50 comprises a hysteresis comparator 501, a controlled current source 502, a standard current source 503, an inverter 302, a switch transistor 304, a capacitor 305, and a comparator 306. As shown, the converting circuit 301 and the current source 303 are replaced by the hysteresis comparator 501, the controlled current source 502, and the standard current source 503. The hysteresis characteristics of the hysteresis comparator 501 are adapted to reduce the sensitivity of the switching of the error voltage Ve to avoid errors caused by noise. When the error voltage Ve is larger than a high voltage Vc, a signal output from the hysteresis comparator 501 enables the controlled current source 502; when the error voltage Ve is smaller than a low voltage Vd, a signal output from the hysteresis comparator 501 disables the controlled current source 502. If the error voltage Ve is within a hysteresis region between the high voltage Vc and the low voltage Vd, the output signal of the hysteresis comparator 501 does not change. Please refer FIG. 14. Under high load conditions, the controlled current source 502 and the standard current source 503 both provide the maximum current I2 to charge the capacitor 305, and the oscillation signal CLKOUT corresponds to a maximum frequency f2; when under the minimum loads, only the standard current source 404 provides a minimum current I1 to charge the capacitor 305, and the oscillation signal CLKOUT is at a minimum frequency f1.

In conclusion, the two embodiments of the adaptive dead-time controller of the present invention can adjust the cycle time of the oscillation signal OSC according to the loading condition presented by a load device 6, to indirectly adjust the power converter 8. Therefore, the power converter 8 can stably operate under either heavy load or light loads, and the power converter 8 reduces power consumption under light or no loads.

Although the present invention has been explained in relation to its preferred embodiment, it is to be understood that many other possible modifications and variations can be made without departing from the spirit and scope of the invention as hereinafter claimed.

What is claimed is:

1. An adaptive dead-time generator for adjusting an oscillation signal corresponding to a clock signal according to an output voltage, comprising:
    a converting circuit for outputting a converted signal corresponding to the output voltage;
    a controlled power source for providing an output energy according to the converted signal;
    a standard power source for providing a default energy;
    an inverter for inputting the clock signal to output an inverted clock signal;
    an energy storage unit for storing the output energy and the default energy and providing a charging energy;
    a switch for providing a path for the energy storage unit to discharge the output energy and the default energy according to the inverted clock signal; and
    a comparator for comparing the charging voltage with a threshold voltage and outputting the oscillation signal according to the comparison result;
    wherein when the output voltage drops, a rising edge of the oscillation signal is delayed by a dead-time from a rising edge of the clock signal.

2. The adaptive dead-time generator as claimed in claim 1, wherein the controlled power source is a controlled current source.

3. The adaptive dead-time generator as claimed in claim 1, wherein the controlled power source is a controlled voltage source.

4. The adaptive dead-time generator as claimed in claim 1, wherein the standard power source is a standard current source.

5. The adaptive dead-time generator as claimed in claim 1, wherein the energy storage unit is a capacitor.

6. The adaptive dead-time generator as claimed in claim 1, wherein an amount of the output energy and the converted signal correspond to a first order function, a second order function or an exponential function.

7. The adaptive dead-time generator as claimed in claim 1, wherein the converting circuit comprises a schottky diode and an adder.

8. The adaptive dead-time generator as claimed in claim 1, wherein the converting circuit comprises a hysteresis comparator.

9. An adaptive dead-time generator for adjusting an oscillation signal corresponding to a clock signal according to an output voltage, comprising:
   an oscillator for outputting a clock output signal according to the output voltage; and
   a counter for counting the clock output signal and outputting the oscillation signal when the count exceeds a threshold number;
   wherein when the output voltage drops, a rising edge of the oscillation signal is delayed by a dead-time from a rising edge of the clock signal.

10. An adaptive dead-time controller for adjusting a operating frequency of a power converter according to a load condition, comprising:
   a reference voltage generator for providing a reference voltage;
   an error amplifier for comparing an output voltage with the reference voltage then outputting an error voltage, the output voltage being proportionally to the load condition;
   a comparator for comparing the error voltage with a switch voltage then outputting a reset signal;
   an oscillator for providing a clock signal;
   an adaptive dead-time generator for adjusting an oscillation signal corresponding to the clock signal according to the load condition then outputting the adjusted oscillation signal; and
   a flip-flop for outputting a gate pulse according to the reset signal and the oscillation signal,
   wherein the gate pulse is adapted to adjust the function of the power converter, when the load condition is light, a rising edge of the oscillation signal is delayed by a dead-time from a rising edge of the clock signal.

11. The adaptive dead-time controller as claimed in claim 10, wherein the adaptive dead-time controller further comprising at least one compensation circuit.

12. The adaptive dead-time controller as claimed in claim 10, wherein adaptive dead-time generator comprises:
   a converting circuit for outputting a converting signal corresponding to the output voltage;
   a controlled power source for providing an output energy according to the converted signal;
   a standard power source for providing a default energy;
   an inverter for inputting the clock signal to output an inverted clock signal;
   an energy storage unit for storing the output energy and the default energy and providing a charging energy;
   a switch for providing a path for the energy storage unit to discharge the output energy and the default energy according to the inverted clock signal; and
   a comparator for comparing the charging energy with a threshold voltage and outputting the oscillation signal according to the comparison result.

13. The adaptive dead-time controller as claimed in claim 12, wherein the controlled source is a controlled current source.

14. The adaptive dead-time controller as claimed in claim 12, wherein the controlled source is a controlled voltage source.

15. The adaptive dead-time controller as claimed in claim 12, wherein the standard source is a standard current source.

16. The adaptive dead-time controller as claimed in claim 12, wherein the energy storage unit is a capacitor.

17. The adaptive dead-time controller as claimed in claim 12, wherein an amount of the output energy and the converting signal correspond to a first order function, a second order function or an exponential function.

* * * * *